UNITED STATES PATENT OFFICE 2,386,321

RESINOUS PRODUCTS AND PROCESS OF MAKING THEM

John W. Kroeger and Harry F. O'Connor, Philadelphia, Pa., assignors to Fred'k H. Levey Co., Inc., New York, N. Y., a corporation of New York No Drawing. Application January 6, 1943, Serial No. 471,488

8 Claims. (Cl. 260—24)

This invention relates to resins useful in coating compositions, more particularly to novel, hard resins prepared from cheap raw materials such as rosin and its derivatives or equivalents, by interaction with a liquid condensate of a ketone and an aldehyde, and to a process of making such resins.

An object of the invention is to provide a new class of resins having desirable characteristics for use in coating compositions.

Another object of the invention is to provide low-cost, thermoplastic resins of comparatively high melting-point, having good solubility in both hydrocarbon solvents and in drying oils.

A further object of the invention is to provide a novel class of resins by the interaction of rosin or one of its derivatives or equivalents with a condensate prepared by the reaction of a ketone with an aldehyde in the presence of alkali.

Another object of the invention is to provide a process for making these resins.

Other objects and advantages of the invention will be apparent as it is better understood by reference to the following specification in which the numerous examples represent preferred embodiments and are not intended to limit the invention.

We have discovered that natural resins which have comparatively low melting points may be combined with liquid condensates of a ketone and an aldehyde to produce valuable resinous products which, contrary to expectation, have relatively high melting points. These new products result from reactions, the mechanism of which is not fully understood. That the reaction occurs is evidenced by the fact that after reaction the ketone-aldehyde condensate which is soluble in water cannot be removed from the product by extraction with water. Furthermore, the products are different in all essential characteristics from the materials used in preparing them.

In the practice of the invention, a natural resin or treated natural resin, such as rosin or an allied material, is melted and heated at some temperature between 390° F. and 600° F., usually 400–500° F. While the molten resin is held at the required temperature, a liquid condensate of a ketone and an aldehyde is added with constant agitation. The rate of addition depends upon the foaming which results from evolution of water vapor. The foam must be allowed to subside before more ketone-aldehyde condensate is added, or the rate of addition must be so controlled that foaming is not excessive. This addition may require from 1 to 10 hours depending on the initial resin chosen, the temperature of the reaction mixture, the size of the batch, the ratio of the volume of the batch to the size of the container, and the type and speed of agitation. The proportion of ketone-aldehyde condensate may be varied from 3% to 40% on the weight of the initial resin. The preferred proportion is from 10%–17%.

Suitable initial resins are rosin, limed rosin, zincated rosin, ester gum, rosin-maleic adduct, Manila Copal, Manila ester or any similar resin of high acid number or derivative of a resin of high acid number. The acid number of the initial resin, or the natural resin from which the initial resin is derived, should lie in the range from 100 to 200.

Suitable ketone-aldehyde condensates are prepared by reaction of a ketone with an aldehyde such as formaldehyde, paraformaldehyde, trioxymethylene, acetaldehyde, aldol, crotonaldehyde, acrolein or furfural in the presence of an alkaline catalyst followed by removal by distillation of all or part of the volatile material. The preferred ketones are the lower members of the series, such as acetone, methyl ethyl ketone, diacetone alcohol and mesityl oxide. The preferred condensate is a product of the reaction of acetone and formaldehyde, although others may be used to confer special properties on the product.

We have found that resins prepared according to the invention are particularly valuable in coating compositions, as they can be cooked into drying oils and are also soluble in volatile hydrocarbon solvents. The products are insoluble in water.

The details of the process and the properties of the products are more completely described in the following examples.

Example 1

*Part A.*—An acetone-formaldehyde condensate was made as follows: To a mixture of 5.120 lbs. of acetone and 14.317 lbs. of 37% formaldehyde was added half of a catalyst solution made by dissolving 0.441 lb. of anhydrous sodium carbonate in one pound of water. This solution was stirred for 1.5 hours while cooling in tap-water, then the remainder of the catalyst was added. After stirring for 47 hours at room temperature, the product was neutralized by adding 0.954 lb. of 85% lactic acid. Water and unreacted acetone were distilled off up to 110° C. at atmospheric pressure. The remaining water was removed by vacuum-distilling up to 145° at 22 mm. The product was a pale yellow syrup having a viscosity of 2,360 poises at 31° C. In subsequent examples varying proportions of water as indicated were retained in the condensate.

Part B.—A hardened limed rosin was made by the following procedure. A limed rosin (151.0 grams) with a softening point of 247° F. was melted and held at 403–414° F. under carbon-dioxide, while 29.5 grams of acetone-formaldehyde condensate was added slowly with stirring during 3.2 hours. Heating was continued for a few minutes until foaming had subsided, then the molten resin was poured into a shallow container and allowed to cool. A yield of 167.6 grams or 92.8% theory was obtained. The product was a hard, brittle, light brown resin with a softening point of 300° F. and an acid number of 57.3. It was soluble in aliphatic and aromatic hydrocarbon solvents, and could be cooked into drying oils.

Example 2

Into an electrically heated, stainless steel kettle was charged 52 lbs. 4 oz. of limed rosin (softening point: 252° F.). The resin was melted under carbon dioxide and heated to 420° F. with stirring. While the temperature was raised gradually from 420° to 465° F., 7 lbs. 8 oz. of an acetone-formaldehyde condensate, prepared as in Example 1, Part A, was added during 4.75 hours. The final resin had a softening point of 302° F. and was otherwise similar to the product of Example 1.

Example 3

The process of Example 1, Part B, was repeated, using an acetone-formaldehyde condensate which had been prepared as in Example 1, Part A, but which had not been stripped in vacuum. Since this condensate contained 37.1% water, 47.0 grams were used corresponding to 29.5 grams of 100% material. The product was a hard, brittle resin with a softening point of 305° F. and was similar in other respects to the product of Example 1, Part B.

Example 4

A hardened rosin was prepared in the following way. Rosin (151.0 grams) having a softening point of 155° F. was fused and held at 414–455° F. with stirring while 30.1 grams of an acetone-formaldehyde condensate (Example 1) containing 16.9% of water was added slowly during 2.5 hours. A yield of 174.9 grams (99.4% of theory) of a hard, brittle resin was obtained. The resin had a softening point of 203° F. and was soluble in a wide range of solvents.

Example 5

One hundred and fifty grams of a rosin with a softening point of 150° F. was melted and held at 392–403° F. with stirring while 8.4 grams of powdered calcium hydroxide was added during 0.67 hour. The temperature was then held at 406–428° F. while 29.5 grams of acetone-formaldehyde condensate (Example 1) was added slowly during 4.67 hours. The resulting resin had a softening point of 265° F., and was similar to the product of Example 1.

Example 6

One hundred and fifty grams of rosin (softening point 150° F.) was fused and held at 397–406° F. with stirring while 29.5 grams of acetone-formaldehyde condensate (Example 1) was added during one hour. When this step was complete, 8.4 grams of powdered calcium hydroxide was added during 3.8 hours while the temperature was held at 406–428° F. The resulting resin had a softening point of 250° F. and was otherwise similar to the product of Example 5.

Example 7

To 151.0 grams of melted limed rosin (softening point 247° F.) was added 7.3 grams of raw linseed oil, then the mixture was stirred and heated at 428° F. for twenty minutes. Acetone-formaldehyde condensate (Example 1) (29.5 grams) was then added slowly during seven hours while the temperature was held at 428–442° F. The resulting resin had a softening point of 276° F. and an acid number of 42.0.

Example 8

Example 6 was repeated using 59.0 grams of acetone-formaldehyde condensate. The product, a hard, brown resin, had a softening point of 299° F. and an acid number of 18.1.

Example 9

A hardened ester gum was made by the following procedure:

An ester gum (150.0 grams) with a softening point of 156° F. and an acid number of 7.5 was fused and held at 453–455° F. with stirring, while 35.5 grams of an acetone-formaldehyde condensate (Example 1) containing 16.9% of water was added gradually during 4.75 hours. The product (151.7 grams) was a slightly cloudy, hard, brown resin with a softening point of 219° F. and an acid number of 12.6. It was soluble in both aliphatic and aromatic hydrocarbon solvents.

Example 10

A rosin-maleic adduct was prepared by reacting 302 grams of rosin with 98.0 grams maleic anhydride at 320–377° F. during 20 minutes with constant agitation. The product was a resinous solid with an acid number of 275 and a softening point of 165° F.

Exactly 151.0 grams of the above-prepared rosin-maleic adduct was heated at 380–440° F. with stirring while 30.2 grams of acetone-formaldehyde condensate (Example 1) was added gradually during 2.67 hours. The product was a dark, hard resin having a softening point of 258° F. and an acid number of 198. It was soluble only in hydroxylated solvents or mixtures of such solvents with toluene.

Example 11

A hardened, zincated rosin was made as follows Exactly 151.0 grams of a zincated rosin with a softening point of 280° F. was fused and held at 428–473° F. while 29.5 grams of acetone-formaldehyde condensate (Example 1) was added gradually during one hour. The product was a very hard, brittle resin with a softening point of 397° F. and was soluble only in aromatic hydrocarbon solvents.

Example 12

One hundred fifty grams of rosin (softening point 155° F.) was heated to 439° F. then 5.6 grams of zinc oxide was added, and the mixture was held at 439–455° F. for 20 minutes with stirring. During the next three hours, 35.5 grams of an acetone-formaldehyde condensate (Example 1) containing 16.9% of water was added gradually with continued agitation while the temperature was maintained at 428–446° F. The resin produced had a softening point of 259° F.

and an acid number of 61.0, and was otherwise similar to the product of Example 11.

Example 13

To 151.0 grams of molten zincated rosin (softening point 280° F.) was added 15.1 grams of raw linseed oil and the mixture was held at 347–446° for 25 minutes with continual agitation. Acetone-formaldehyde condensate (Example 1) (29.5 grams) was then added during 2.25 hours, while the temperature was held at 410–446° F. The product was a hard resin with a softening point of 275° F. and an acid number of 11.6. This resin was soluble in both aliphatic and aromatic hydrocarbon solvents.

Example 14

An acetone-furfural condensate was prepared in the following manner. A mixture of 150 grams of redistilled furfural and 50 grams acetone was dropped slowly with good stirring into 40 grams 15% aqueous sodium hydroxide during 1.33 hours. The temperature was kept below 140° F. by intermittent cooling in cold water. The mixture was stirred for one hour, then was neutralized by adding 16 grams 85% lactic acid followed by stirring of one hour more. Part of the water was decanted from the oily product and the remainder was removed by stripping in vacuum for 40 minutes at 86–230° F./20–14 mm. The product, 158.1 grams, was a dark-brown oil with a blue reflex.

Exactly 151.0 grams of limed rosin was melted and held at 405–428° with stirring while 29.5 grams of the acetone-furfural condensate prepared above was added slowly during 5.8 hours with stirring. The product was a very dark, hard resin with a softening point of 265° F. and an acid number of 3.7. The resin was soluble in both aliphatic and aromatic hydrocarbon solvents.

Example 15

A hardened Manila copal was made by melting 150.0 of Loba C (softening point 239° F.) and heating to 454° F. While the temperature was held at 454–460° F., 4.4 grams of an acetone-formaldehyde condensate (Example 1) containing 16.9% water was added with stirring during 1.33 hours. The final resin (130 grams) had a softening point of 284° F. and was soluble in hydroxylated solvents.

Example 16

One hundred fifty grams of Manila ester (softening point 219° F.) was fused and held at 450–464° F. with stirring while 32.0 grams of an acetone-formaldehyde condensate (Example 1) containing 16.9% of water was added during four hours. The product, a moderately hard resin with a softening point of 238° F. had an acid number of 7.6 and was soluble in aromatic hydrocarbons. A yield of 164.6 grams was obtained.

Example 17

One hundred fifty grams of a limed rosin with a softening point of 260° F. was fused and held at 446° to 464° F. while 11.6 grams of hydracetyl acetone (boiling point 89°/33 mm.) was added slowly during 3.5 hours. The product (143.2 grams) was a brittle, light-brown resin with a softening point of 253° F.

The hydracetyl acetone was prepared by condensing acetone with acetaldehyde in the presence of sodium carbonate.

Solutions of the resin, prepared as in Examples 1, 2, 3, 4, 5, 6, 7, 8, 9, 11, 12, 13, 14, 16 and 17, containing 40–60% solids in a hydrocarbon solvent, were quickly converted to stable, well-dispersed, water-in-oil emulsions simply by mixing with 15–25% of water. No emulsifying agent was required, although a trace of alkaline material increased the speed of emulsification.

As indicated in several examples, rosin derivatives may replace the corresponding natural resin in the preparation of the desired products. Hence the term "natural resin" in the accompanying claims comprehends the derivatives of the natural resins defined herein. A further modification involves as in Example 7 the preliminary cooking of the natural resin or derivative in a small quantity of a drying oil such as linseed oil.

These examples are illustrative of the many variations which are possible in the selection of reactive materials for the purpose of the invention and of the variety of products which are obtainable. These products are characterized in general by melting points considerably higher than those of the natural resins employed. They are generally soluble in hydrocarbon solvents and in drying oils. Although primarily adapted for use in preparing coating compositions, the products may be used for various purposes for which resins of similar characteristics are employed.

Various changes may be made in the details of procedure and in the selection of reactive materials employed without departing from the invention or sacrificing the advantages thereof.

We claim:

1. A resin consisting of the reaction product of a resinous compound from the class consisting of natural resins having acid numbers between 100 and 200, the glycerol esters and the calcium and zinc salts of such resins at a temperature of 390° F. to 600° F. with from 3% to 40% by weight of a liquid product separately prepared by condensing a lower saturated aliphatic ketone and an aldehyde from the class consisting of the straight chain lower aliphatic aldehydes and furfural.

2. A resin consisting of the reaction product of a resinous compound from the class consisting of natural resins having acid numbers between 100 and 200, the glycerol esters and the calcium and zinc salts of such resins at a temperature of 390° F. to 600° F. with from 3% to 40% by weight of a product separately prepared by condensing a lower saturated aliphatic ketone and an aldehyde from the class consisting of the straight chain lower aliphatic aldehydes and furfural in the presence of an alkaline catalyst.

3. The process of preparing an improved resin which comprises reacting a resinous compound selected from the class consisting of natural resins having acid numbers between 100 and 200, the glycerol esters and the calcium and zinc salts of such resins at a temperature of 390° F. to 600° F. with from 3% to 40% by weight of a product separately prepared by condensing a lower saturated aliphatic ketone and an aldehyde from the class consisting of the straight chain lower aliphatic aldehydes and furfural in the presence of an alkaline catalyst.

4. The process of preparing an improved resin which comprises melting a resinous compound from the class consisting of natural resins having acid numbers between 100 and 200, the glycerol esters and the calcium and zinc salts of such resins, gradually adding to such resinous compound, with continuous stirring, from 3% to 40% by weight of a liquid condensation product of a lower saturated aliphatic ketone and an aldehyde from the class consisting of straight chain lower aliphatic aldehydes and furfural, and maintaining the mixture at 390° F. to 600° F. until reaction of said resinous product and the condensation product is completed.

5. The process as in claim 3 in which the ketone-aldehyde condensate is prepared from acetone and formaldehyde.

6. The process as in claim 3 in which the ketone-aldehyde condensate is prepared from acetone and acetaldehyde.

7. The process as in claim 3 in which the ketone-aldehyde condensate is prepared from acetone and furfural.

8. The process as in claim 3 in which the reaction is conducted slowly during a period of from 1-10 hours.

JOHN W. KROEGER.
HARRY F. O'CONNOR.